Dec. 12, 1939.　　G. W. CARLSON ET AL　　2,182,889
LUBRICATION SYSTEM FOR AUTOMOTIVE AXLES
Filed Sept. 1, 1937　　3 Sheets-Sheet 1

INVENTOR
BY GUSTAV W. CARLSON
ROBERT C. RUSSELL
Kwis Hudson & Kent
ATTORNEYS

Dec. 12, 1939.  G. W. CARLSON ET AL  2,182,889
LUBRICATION SYSTEM FOR AUTOMOTIVE AXLES
Filed Sept. 1, 1937  3 Sheets-Sheet 2

INVENTOR.
GUSTAV W. CARLSON
BY ROBERT C. RUSSELL
Kwis Hudson & Kent
ATTORNEYS

Dec. 12, 1939.   G. W. CARLSON ET AL   2,182,889
LUBRICATION SYSTEM FOR AUTOMOTIVE AXLES
Filed Sept. 1, 1937   3 Sheets-Sheet 3

INVENTOR.
GUSTAV W. CARLSON
BY ROBERT C. RUSSELL
Kwis Hudson & Kent
ATTORNEYS

Patented Dec. 12, 1939

2,182,889

UNITED STATES PATENT OFFICE 2,182,889

LUBRICATION SYSTEM FOR AUTOMOTIVE AXLES

Gustav W. Carlson, Cleveland Heights, and Robert C. Russell, Shaker Heights, Ohio, assignors to Eaton Manufacturing Company, Cleveland, Ohio, a corporation of Ohio Application September 1, 1937, Serial No. 161,952

4 Claims. (Cl. 184—11)

The present invention relates to automotive vehicles, and more particularly to a lubrication system for automotive drive axles.

Heretofore in the art numerous devices have been employed to lubricate certain parts of automotive rear axles located above the normal level of the lubricant therein, but these prior art devices for the most part rely upon centrifugal force to throw lubricant from the ring gear and differential unit assembly into or onto a collector from which it flows to the desired bearing, etc. At very slow speeds, such as are often encountered in truck operation, the centrifugal force is not sufficient to throw lubricant, or sufficient lubricant, into or onto the collector, with the result that the bearings, etc., do not receive adequate lubrication and often fail.

An object of the invention is the provision of a novel means for supplying lubricant to various bearings, gears and/or other rotating parts of an automotive drive axle located above the normal level of the lubricant therein, at all speeds within the range of operation of the vehicle.

Another object of the invention is the provision of a novel means for supplying lubricant to various bearings of an automotive drive axle, to the different differential gears, etc. thereof, and to the speed change or reduction gears if such are included therein, at all speeds within the range of operation of the vehicle, which means will be positive and reliable in operation and will not depend upon centrifugal force for its operation.

Another object of the invention is the provision of a novel automotive drive axle comprising means for supplying lubrication to various bearings, gears and/or other rotating parts thereof located above the normal level of the lubricant therein at all speeds within the range of operation of the vehicle.

Another object of the invention is the provision of a novel automotive drive axle, with or without speed change or reduction gears comprising means for positively supplying lubricant to various bearings and/or gears, etc., thereof at all speeds within the range of operation of the vehicle, which does not depend upon centrifugal force for its operation.

The present invention resides in certain novel details of construction, combinations and arrangements of parts, and further advantages thereof will be apparent to those skilled in the art to which it relates from the following description of the preferred embodiment thereof described with reference to the accompanying drawings, forming a part of this specification, in which similar reference characters designate corresponding parts throughout the several views, and in which.

Figure 1:
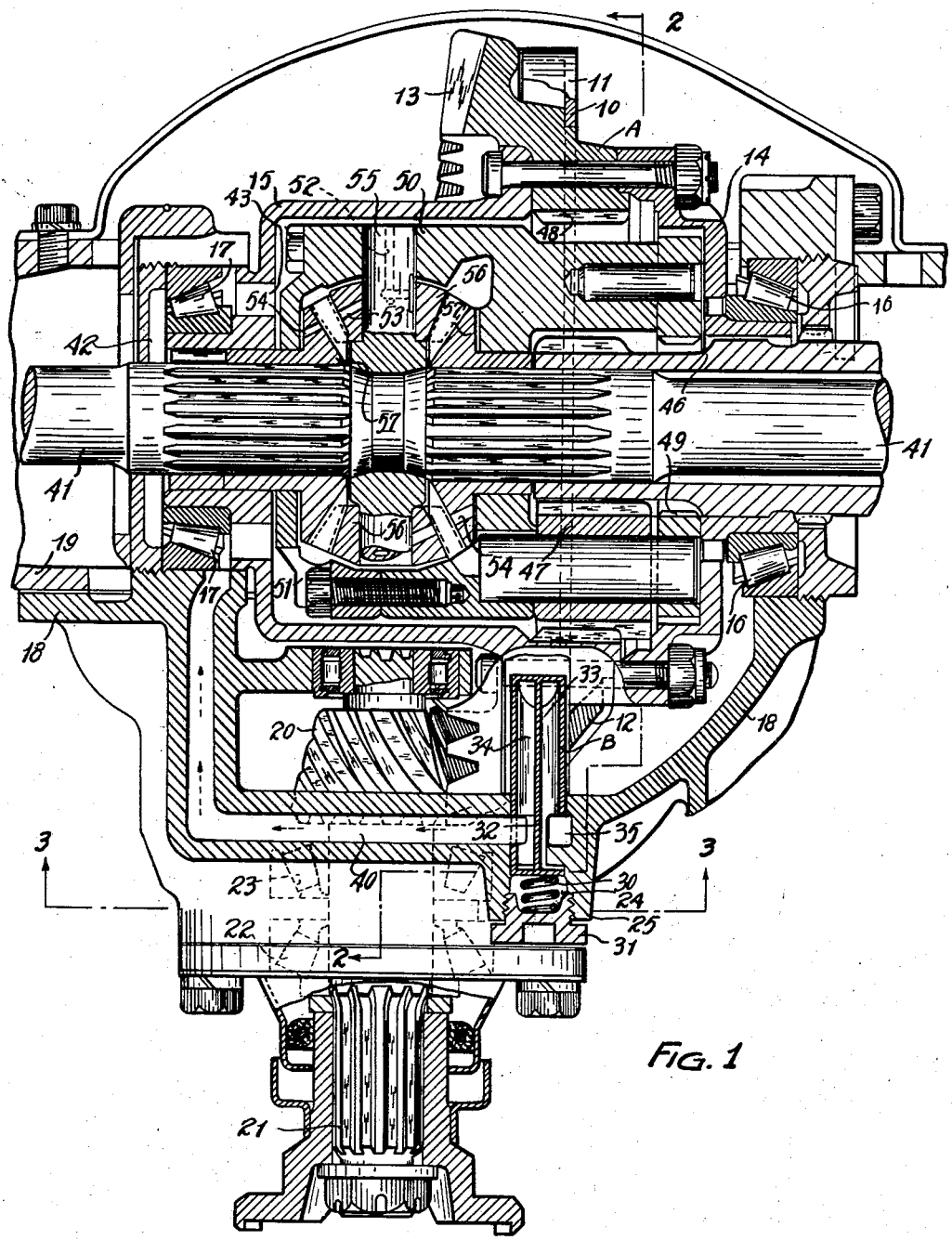
Fig. 1 is a plan view with portions in section approximately on the line 1—1, of Fig. 2, showing a two-speed truck rear axle embodying the present invention.
Figure 2:
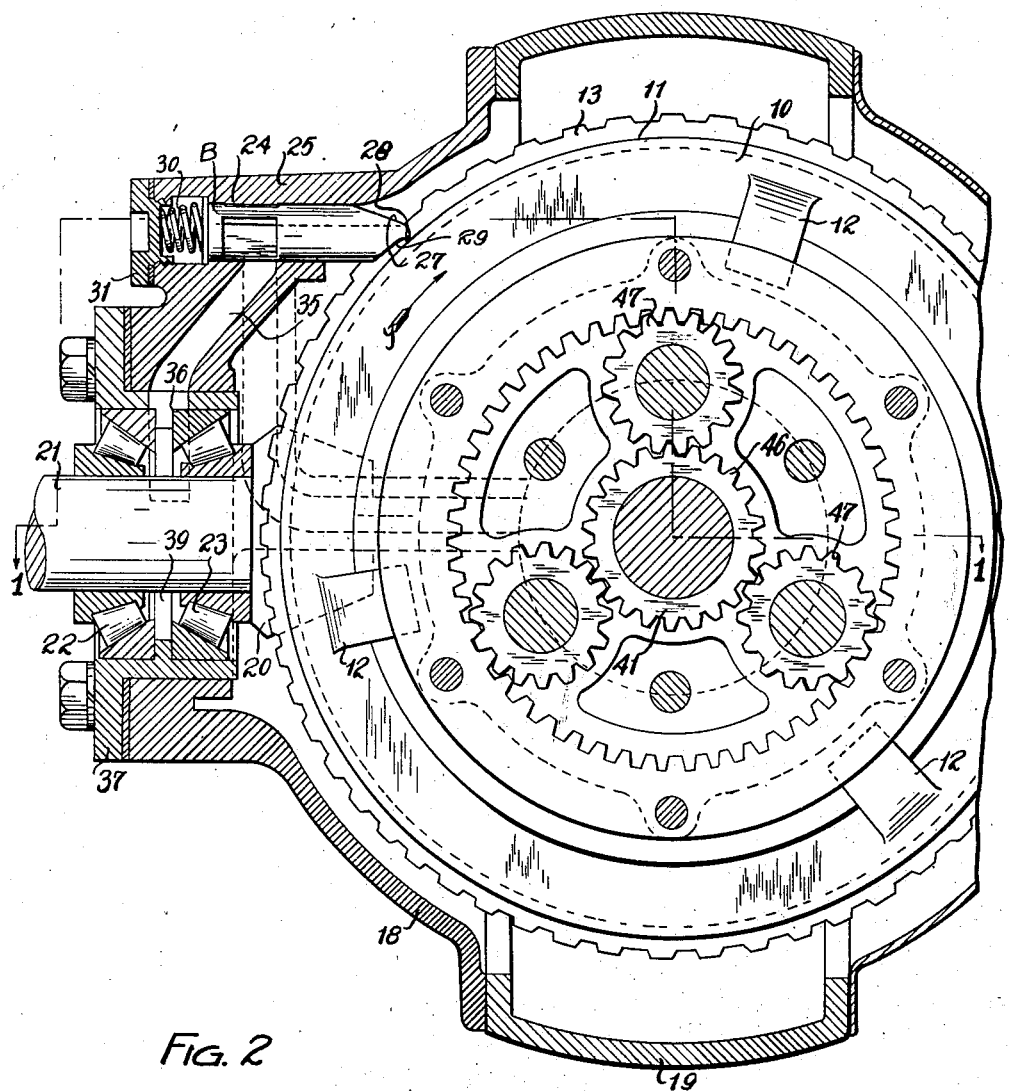
Fig. 2 is a section approximately on the line 2—2 of Fig. 1.
Figure 3:
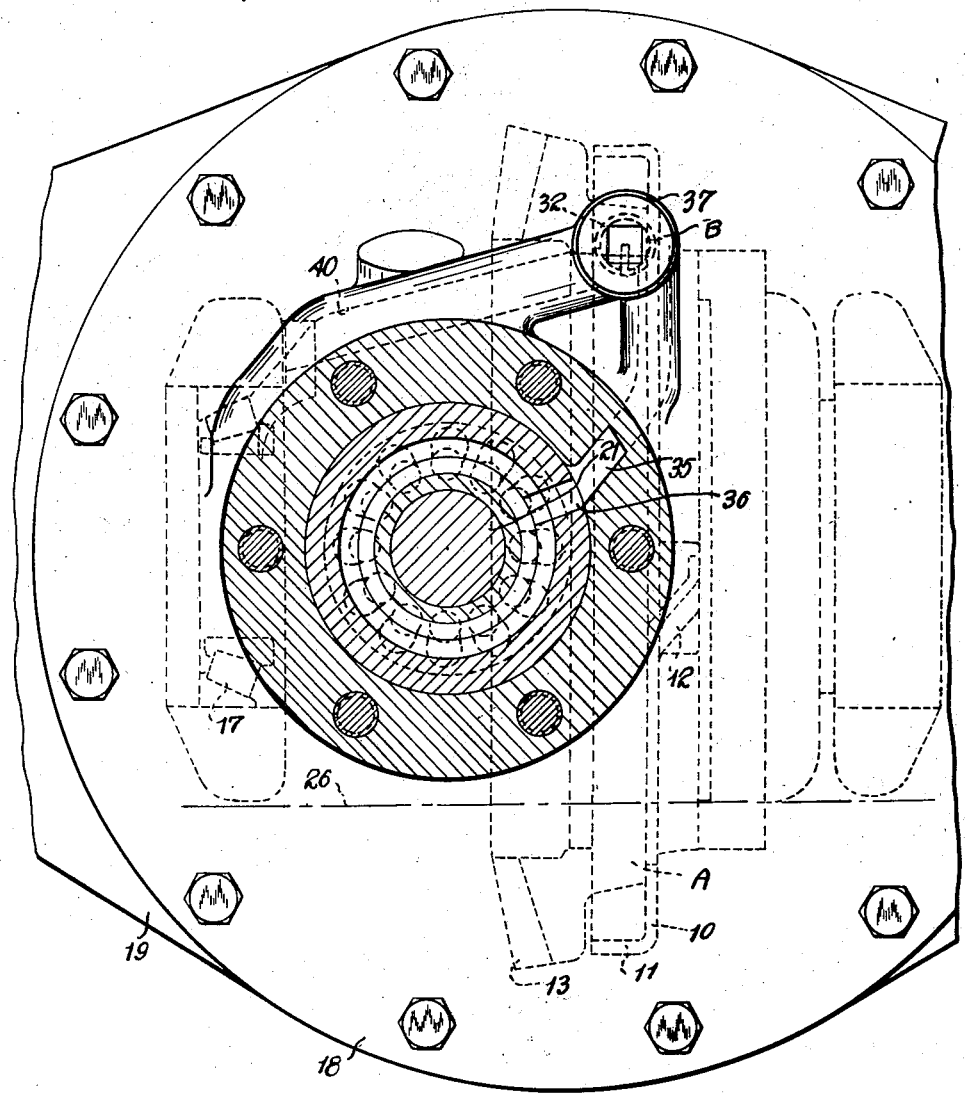
Fig. 3 is a section approximately on the line 3—3 of Fig. 1.
Figure 4:
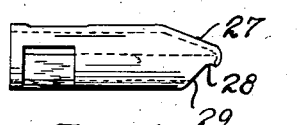
Fig. 4 is a side elevation of the lubricant collector.
Figure 5:
Fig. 5 is an end elevation of the lubricant collector shown in Fig. 4, looking toward the left.

The present invention is especially applicable to automotive truck axles which, under some conditions, especially when traveling through mountainous or very hilly country, operate under heavy loads for considerable periods at comparatively low speeds, and is herein shown and described as embodied in a two-speed truck axle. But it is to be understood that the invention is not limited to truck axles or to the particular construction of axle shown herein, which is merely illustrative of the invention.

The automotive axle shown in the drawings is a well known commercial axle modified to embody the present invention and operates in a manner similar to that shown and described in U. S. Patent No. 1,623,212, except that the direction of drive is reversed, and only those parts of the axle which are necessary to the complete understanding of the present invention are herein referred to and described in detail.

Referring to the drawings, the reference character 10 designates a cap-like member including a peripheral flange 11 formed integral with the body portion thereof. The member 10 is fixed to the ring gear and differential unit assembly, designated generally by the reference character A, by a plurality of fingers 12 formed integral with said member and extending into slots cut in the hub of the ring gear 13. The fingers 12 are clamped within the slots in the hub of the ring gear 13 by the left-hand support case 14 of the assembly A which also includes a right-hand support case 15. The ring gear and differential assembly is rotatably supported by antifriction bearings 16 and 17 in a carrier 18 detachably secured to the rear axle housing 19. The assembly A is adapted to be driven by a pinion 20 fixed to a shaft 21 rotatably supported in the carrier 18 by roller bearings 22 and 23.

The outer surface of the cylindrical flange 11 of the member 10 is continuously engaged by a substantially tubular collector or scraper, designated generally by the reference character B and slidably supported in a cylindrical aperture 24 in a boss 25 formed integrally with the upper part of the carrier 18. As the assembly A rotates in the direction indicated by the arrow y during operation of the axle, the collector B collects or scrapes lubricant from the flange 11 of the member 10 the lower part of which extends below the normal level of the lubricant 26 in the rear axle housing. The upper part 27 of the front end of the scraper B is dropped and formed into a hook-like nose 28 which conforms to the periphery of the flange 11, and the under side 29 of the front end of the scraper is cut away so that the lubricant scraped from the flange 11 by the hook-like end 28 can readily flow through the openings thus formed into the interior of the collector or scraper. The forward end 28 of the collector or scraper B is continuously urged into contact with the flange 11 of the member 10 by a coil spring 30 interposed between the rear end of the scraper B and a plug or cap 31 threaded into the counterbored rear end of the aperture 24. The spring 30 provides a substantially constant pressure between the member 10 and the scraper B and allows the scraper to readily follow the periphery of the member which may not run exactly true. The aforesaid construction also minimizes the amount of noise incident to the scraper rubbing against the member 10 and assists in dampening whatever noise is produced.

In the present instance the scraper has a partition 32 formed therein dividing the same into two chambers 33 and 34, each of which communicates with separate ports or passages in the carrier housing. The right-hand chamber 33, as viewed in Fig. 1, has a passage or port 35 communicating therewith, the lower end of which opens, through a passage or port 36 in the member 37, into the chamber 39 which houses the bearings 22 and 23 for the pinion shaft 21. A separate passage or port 40 communicates with the left-hand chamber 34 of the collector 24 and the left-hand bearing 17 for the assembly A. The construction is such that lubricant collecting on the scraper B will flow through passageways or ports 35 and 36 to the pinion shaft bearings 22 and 23, and the left-hand bearing 17, respectively, for the assembly A. The lubricant entering the bearing 17 is prevented from flowing to the left along the drive axle 41 and the rear axle housing 19 by a bearing adjuster 42 which has only a small clearance between it and the drive axle.

From the bearing 17 the lubricant flows into the interior of the enclosure formed by the support cases 14 and 15, and the ring gear 13 of the assembly A through holes 43 formed in the left-hand support case 15, where it lubricates the differential assembly, and the two-speed change gear mechanism comprising the sliding sun gear 46, planet gears 47, orbit gear 48, gears 49, and the necessary shift fork, etc., not shown. Lubricant enters the differential case 50 through a plurality of openings 51 and the flow of lubricant to the various gears, bearings, etc., of the differential is facilitated by a plurality of oil passages or ports 52, 53 and 54 in the pinion shafts 55 and the gears 56 and 57, respectively. Eventually the lubricant returns to the rear axle housing along the sliding sun gear 46 and through the left-hand bearing 16.

The partition 32 in the scraper 24 may be located slightly to one side of the center, thus diverting a larger portion of lubricant into one port or the other, or it may be omitted altogether as will be apparent to those skilled in the art. It will also be seen that two or more partitions may be employed, thus dividing the scraper into a corresponding number of chambers, all of which may be connected to various parts of the axle. While in the present instance a separate member 10 has been included in the ring gear and differential unit assembly A for the collector or scraper to engage, it will be understood that under some circumstances it may be desirable, or even preferable, to have the collector or scraper directly engage the ring gear or some other suitable part of the assembly A.

From the foregoing description of the preferred embodiment of the invention, it will be apparent that the objects of the invention heretofore enumerated have been attained and that a novel and improved means has been provided for positively supplying lubricant to various bearings, differential gears, speed change gears, etc., of an automotive rear axle at all speeds within the range of operation of the vehicle. While the preferred embodiment of the invention has been described in considerable detail, we do not wish to be limited to the particular construction shown, which may be varied within the scope of this invention. It is our intention to hereby cover all adaptations, modifications, and uses thereof that come within the practice of those skilled in the art to which the invention relates, and we particularly point out and claim as our invention, the following:

1. In an automotive axle, the combination of a housing the lower portion of which forms a lubricant reservoir, a member rotatably supported in said housing with the lower portion thereof extending below the normal level of the lubricant in said reservoir, said housing having an aperture extending therethrough, means detachably connected to said housing for closing the outer end of said aperture, a collector or scraper slidably supported in said aperture for collecting or scraping lubricant from the ascending side of said member as the same rotates in operation, a spring interposed between said means and said collector or scraper for continuously urging said collector or scraper into engagement with said member, and a conduit formed in said housing for conducting lubricant from said collector or scraper to a rotatable member of the axle located above the normal level of the lubricant in said reservoir.

2. In an automotive axle, the combination of a housing the lower portion of which forms a lubricant reservoir, a member rotatably supported in said housing with the lower portion thereof extending below the normal level of the lubricant in said reservoir, said housing having a cylindrical aperture in the upper part thereof extending therethrough, means detachably connected to said housing for closing the outer end of said aperture, a tubular collector or scraper slidably supported in said aperture and having a downturned end for collecting or scraping lubricant from the ascending side of said member as the same rotates in operation, a spring interposed between said means and said collector or scraper for continuously urging said collector or scraper into engagement with said member, and a conduit formed in said housing for conducting lubricant from said collector or scraper to a rotatable member of the axle located above the normal level of the lubricant in said reservoir.

3. In an automotive axle, the combination of a housing the lower portion of which forms a lubricant reservoir, a ring gear and differential assembly, a bearing located above the normal level of the lubricant in said reservoir for rotatably supporting said assembly in said housing with the lower portion of said assembly extending below the normal level of the lubricant in said reservoir, said housing having an aperture in the upper part thereof and extending therethrough, means detachably connected to said housing for closing the outer end of said aperture, a collector or scraper supported in said aperture and having a downwardly turned end in contact with the ascending side of said assembly for collecting or scraping lubricant from said assembly as the latter rotates in operation, a spring positioned in said aperture and interposed between said collector or scraper and the closed outer end of said aperture for maintaining said collector or scraper in contact with said assembly, and a conduit formed in said housing communicating with one side of said collector or scraper and with said bearing.

4. In an automotive axle, the combination of a housing the lower portion of which forms a lubricant reservoir, a ring gear and differential assembly, a bearing located above the normal level of the lubricant in said reservoir for rotatably supporting said assembly in said housing with the lower portion of said assembly extending below the normal level of the lubricant in said reservoir, a pinion for rotating said assembly, a second bearing located above the normal level of the lubricant in said reservoir for rotatably supporting said pinion in said housing, said housing having a cylindrical aperture in the upper part thereof extending therethrough, a member detachably connected to said housing for closing the outer end of said aperture, a tubular collector or scraper slidably supported in said aperture and having a downwardly turned end in contact with the ascending side of said assembly for collecting or scraping lubricant therefrom as said assembly rotates in operation, a spring located in said aperture and interposed between said collector or scraper and said member for maintaining said collector or scraper in contact with said assembly, a partition in said collector or scraper, a conduit formed in said housing and communicating with one side of said collector or scraper and with the first mentioned bearing, and a conduit formed in said housing and communicating with the other side of said collector or scraper and the second mentioned bearing.

GUSTAV W. CARLSON.
ROBERT C. RUSSELL.